(12) United States Patent
Yamada

(10) Patent No.: US 7,365,779 B2
(45) Date of Patent: Apr. 29, 2008

(54) IMAGE PROCESSING APPARATUS FOR SELECTIVELY STORING SPECIFIC REGIONS OF AN IMAGE

(75) Inventor: Masahiro Yamada, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 610 days.

(21) Appl. No.: 09/951,605

(22) Filed: Sep. 13, 2001

(65) Prior Publication Data

US 2002/0030735 A1    Mar. 14, 2002

(30) Foreign Application Priority Data

Sep. 14, 2000  (JP)  ............................. 2000-279852
Nov. 7, 2000   (JP)  ............................. 2000-339487

(51) Int. Cl.
*H04N 5/235*   (2006.01)
(52) U.S. Cl. .................. 348/230.1; 348/148; 348/169; 348/208.14; 348/231.9
(58) Field of Classification Search .......... 348/207.99, 348/208.12–208.14, 218.1, 222.1, 230.1, 348/231.9, 43, 239, 148–149, 169–172, 249, 348/349–350, 320, 322
See application file for complete search history.

(56) References Cited

U.S. PATENT DOCUMENTS

| | | | | |
|---|---|---|---|---|
| 4,539,590 A * | 9/1985 | Gage | .......................... | 348/172 |
| 4,910,599 A * | 3/1990 | Hashimoto | ............... | 348/240.2 |
| 4,970,653 A * | 11/1990 | Kenue | ........................ | 701/301 |
| 5,161,632 A * | 11/1992 | Asayama | ..................... | 180/167 |
| 5,196,939 A * | 3/1993 | Elabd et al. | ................. | 348/314 |
| 5,309,137 A * | 5/1994 | Kajiwara | ................... | 340/436 |
| 5,515,448 A * | 5/1996 | Nishitani | ................... | 382/106 |
| 5,541,654 A * | 7/1996 | Roberts | ...................... | 348/301 |
| 5,557,323 A * | 9/1996 | Kajiwara | .................... | 348/140 |
| 5,585,843 A * | 12/1996 | Ishizuka et al. | ....... | 348/208.13 |
| 5,890,083 A * | 3/1999 | Franke et al. | ................. | 701/45 |
| 5,892,855 A * | 4/1999 | Kakinami et al. | .......... | 382/291 |
| 5,949,483 A * | 9/1999 | Fossum et al. | ............. | 348/303 |
| 6,075,559 A * | 6/2000 | Harada | ....................... | 348/148 |
| 6,181,375 B1 * | 1/2001 | Mitsui et al. | .......... | 348/240.99 |
| 6,259,359 B1 * | 7/2001 | Fujinami et al. | ............ | 340/435 |
| 6,320,618 B1 * | 11/2001 | Aoyama | ..................... | 348/335 |

(Continued)

*Primary Examiner*—Lin Ye
*Assistant Examiner*—Chriss S Yoder, III
(74) *Attorney, Agent, or Firm*—Christie, Parker & Hale, LLP

(57) ABSTRACT

The invention provides an image processing apparatus that can reduce the memory capacity of a memory forming part of the image processing apparatus and can correct the optical axis misalignment of a video camera in a simple manner. The image processing apparatus 10, which comprises a video camera 11, a memory 13 for storing an image signal supplied from the video camera, and a CPU 14 for performing prescribed processing on the image signal read out of the memory, includes a selective writing means 12 for selecting only a designated portion of the image signal in accordance with a select command C from the CPU, and for writing only the selected portion as a selected image signal S' into the memory 13. The image processing apparatus further includes a switching means for selecting the pixel data to be stored in the memory by switching between high-density pixel data covering a designated range centralized in a horizontal direction of the image and relatively low-density pixel data covering a full image range. The switching means is capable of switching in accordance with vehicle speed.

2 Claims, 14 Drawing Sheets

U.S. PATENT DOCUMENTS

| | | |
|---|---|---|
| 6,333,760 B1 * | 12/2001 | Terui et al. .................. 348/315 |
| 6,373,518 B1 * | 4/2002 | Sogawa ........................ 348/43 |
| 6,535,242 B1 * | 3/2003 | Strumolo et al. ........... 348/148 |
| 6,686,962 B1 * | 2/2004 | Miyahara .................... 348/311 |
| 6,803,946 B1 * | 10/2004 | Wakiyama et al. ....... 348/211.6 |
| 6,839,452 B1 * | 1/2005 | Yang et al. ................. 382/103 |
| 7,079,668 B2 * | 7/2006 | Kogure et al. .............. 382/104 |
| 7,106,374 B1 * | 9/2006 | Bandera et al. ............. 348/308 |
| 7,268,806 B2 * | 9/2007 | Shimizu .................. 348/221.1 |
| 2003/0058359 A1 * | 3/2003 | Horii .......................... 348/305 |
| 2004/0169767 A1 * | 9/2004 | Norita et al. ............... 348/350 |

* cited by examiner

AMOUNT OF PIXEL DISPLACEMENT [PIXELS]

Fig.13
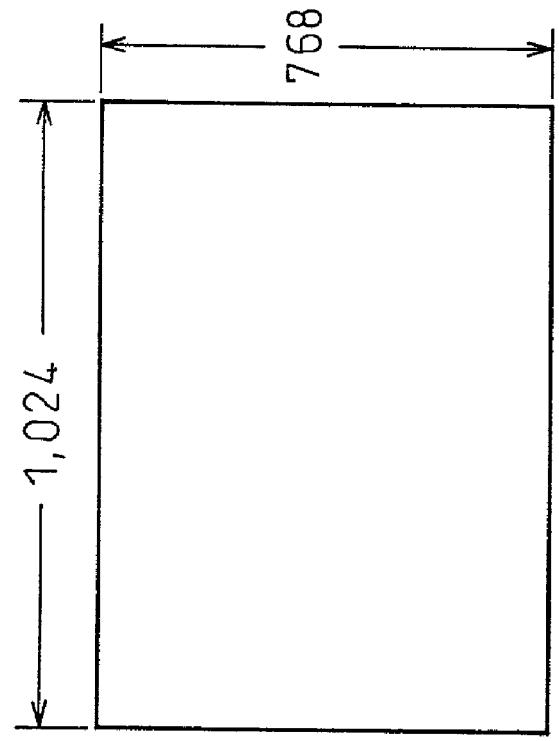
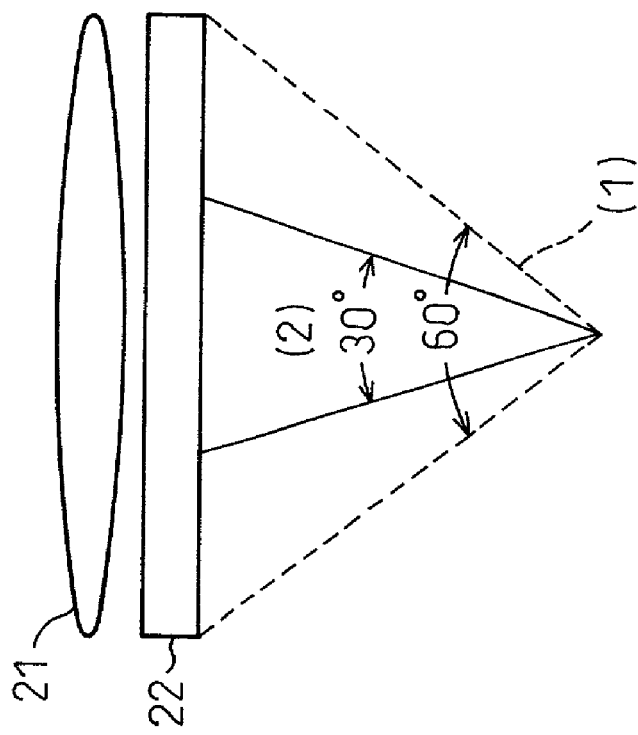

IMAGE PROCESSING APPARATUS FOR SELECTIVELY STORING SPECIFIC REGIONS OF AN IMAGE

CROSS-REFERENCE TO RELATED APPLICATION

This application claims priority of Japanese patent Application No. 2000-279852, filed on Sep. 14, 2000, and Japanese patent Application No. 2000-339487, filed on Nov. 7, 2000.

BACKGROUND OF THE INVENTION

1. Field of the Invention

The present invention relates to an image processing apparatus for detecting lane marks, vehicles, or the like by processing an image of the road ahead captured by an onboard video camera mounted in a suitable position such as the position of the rearview mirror.

2. Description of the Related Art

A video camera mounted in a vehicle captures an image of the road ahead of or behind the vehicle, and an image processing apparatus processes the captured image data and detects vehicles, white lines, etc. on the road ahead to control vehicle-to-vehicle distance, etc.

Such an image processing apparatus can be used to issue an audible alarm to the driver when the distance to the vehicle ahead has been reduced below a preset value, or when the vehicle the driver is driving begins to run over a lane mark.

The image processing apparatus can be used not only to monitor objects ahead when the vehicle is moving forward, but also to detect obstacles in the rear when the vehicle is moving backward.

Thus, the image processing apparatus has the function of capturing the road condition, such as lane marks and other vehicles, in the form of an image and of recognizing the road condition by processing the image. That is, the apparatus performs the function of image recognition.

FIG. 1 is an example of an image captured by a video camera. This image consists of 480 pixels vertically and 640 pixels horizontally, that is, the pixel count is 480×640=307,200. Since each pixel is represented by 8 bits, the data bit count is $$307,200 \times 8 = 2,457,600$$

That is, the amount of data exceeds 2M bits.

For image processing, the data obtained from the video camera is temporarily stored in a memory, and the stored data is processed to obtain necessary information.

Of the component elements of the image processing apparatus, the cost of the memory is by no means small compared with the total cost of the apparatus. The cost of the memory is generally proportional to the capacity of the memory. In the above image processing apparatus, since the amount of data obtained by A/D converting the image signal supplied from the video camera is very large, the memory capacity needed also becomes large, making it difficult to reduce the cost of the memory (a first problem).

There is also the following problem, which is associated with the video camera forming part of the image processing apparatus. That is, there inherently occurs an optical axis misalignment in the stereo camera constituting the video camera. To correct this optical axis misalignment, it has previously been practiced to correct it manually by measuring the amount of optical axis misalignment by using a test pattern at the factory prior to shipment. This method has been impractical as it takes an enormous amount of time and labor. To address this, it is practiced to input the amount of optical axis misalignment to the CPU and have the CPU perform operations to add or subtract the amount of optical axis misalignment to or from the position data, for example, on the image surface of a vehicle traveling ahead. This, however, imposes a greater burden on the CPU, and the image processing speed becomes slow (a second problem).

SUMMARY OF THE INVENTION

In view of the above problems, it is an object of the present invention to provide an image processing apparatus that can reduce the memory capacity required of the memory and can correct the optical axis misalignment without reducing the image processing speed.

To achieve this, in the present invention, there is provided a selective writing means for selecting, in accordance with a select command from the CPU, only a designated portion of the image signal supplied from the video camera, and for writing only the selected signal into the memory.

Further, in the present invention, optical axis misalignment of a stereo camera forming the video camera is measured and stored as an optical axis misalignment amount, and the area necessary for prescribed processing is shifted within the imaging surface in accordance with the optical axis misalignment amount.

Furthermore, in the present invention, to reduce the amount of data to be stored in the memory, the image is split into a plurality of regions, and a selection switching means selects one of the image regions and stores the image data of the selected region in the memory.

Advantageous Effect Of The Invention

In an image processing apparatus that captures an image of the road condition ahead or to the rear by means of a video camera and measures the distance to the vehicle ahead by processing the thus captured image, the apparatus performs mathematical operations based on the input signal from the video camera. At this time, the signal from the video camera must be temporarily stored in a memory. In this case, a memory having a large capacity exceeding 2M bits is needed to store, for example, an entire image area of 640×480 (pixels)×8 (bits).

A low-cost apparatus, however, can only afford a memory of a relatively small capacity, and in view of this, in the present invention the minimum necessary area is selected from the video camera signal and stored in the memory.

By storing only the area necessary for image processing in the memory, the cost of the apparatus can be reduced while maintaining the necessary performance.

As one application example, if the apparatus is used to correct the optical axis misalignment of a stereo camera, an advantageous effect of being able to increase the processing speed of the CPU can be obtained.

Furthermore, according to the present invention, high-density pixel data can be taken from a certain range of the image, and relatively low-density pixel data from the remaining range, for storing in the memory. Since an image can be obtained by switching between these ranges, only the necessary data can be selected and stored in the memory. This serves to reduce the amount of data to be stored in the memory according to the needs without degrading image quality. As a result, the size and cost of the image processing apparatus can be reduced by reducing the required memory capacity of the apparatus.

BRIEF DESCRIPTION OF THE DRAWINGS

The above object and features of the present invention will be more apparent from the following description of the preferred embodiments with reference to the accompanying drawings, wherein:

FIG. 13 is a diagram for explaining an embodiment of a first selection switching mode;

DESCRIPTION OF THE PREFERRED EMBODIMENTS

Figure 1:
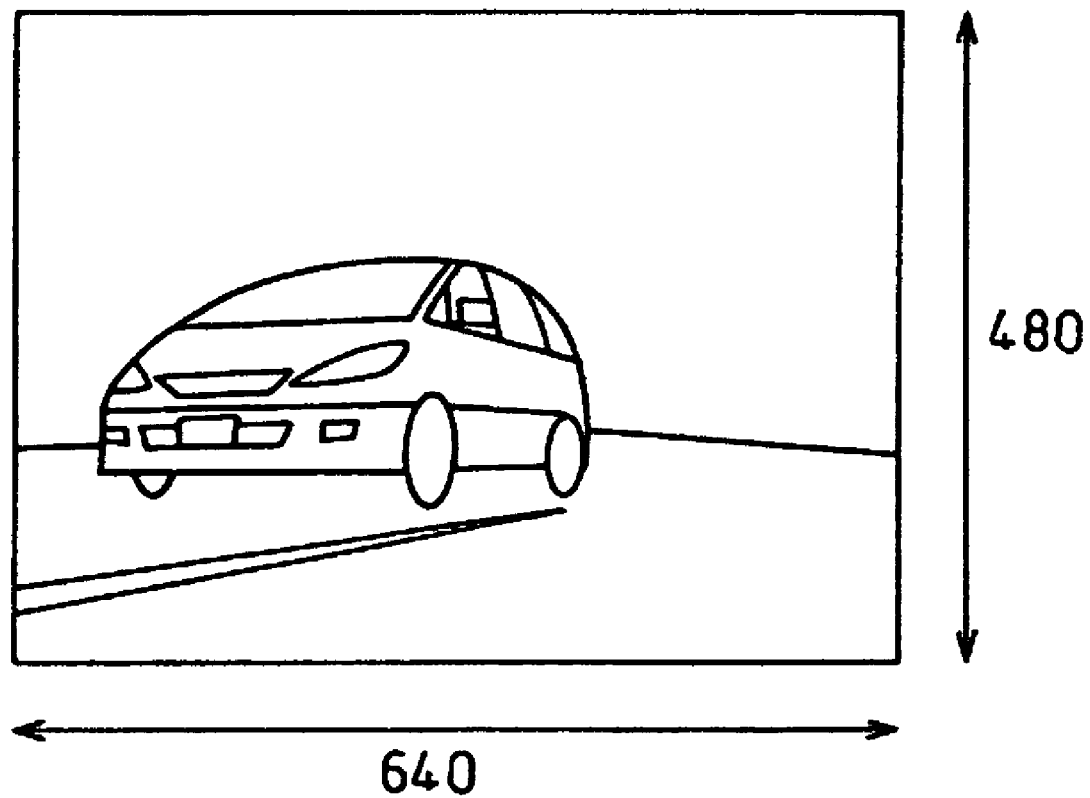
FIG. 1 is a diagram showing an example of an image captured by a video camera.
Figure 2:
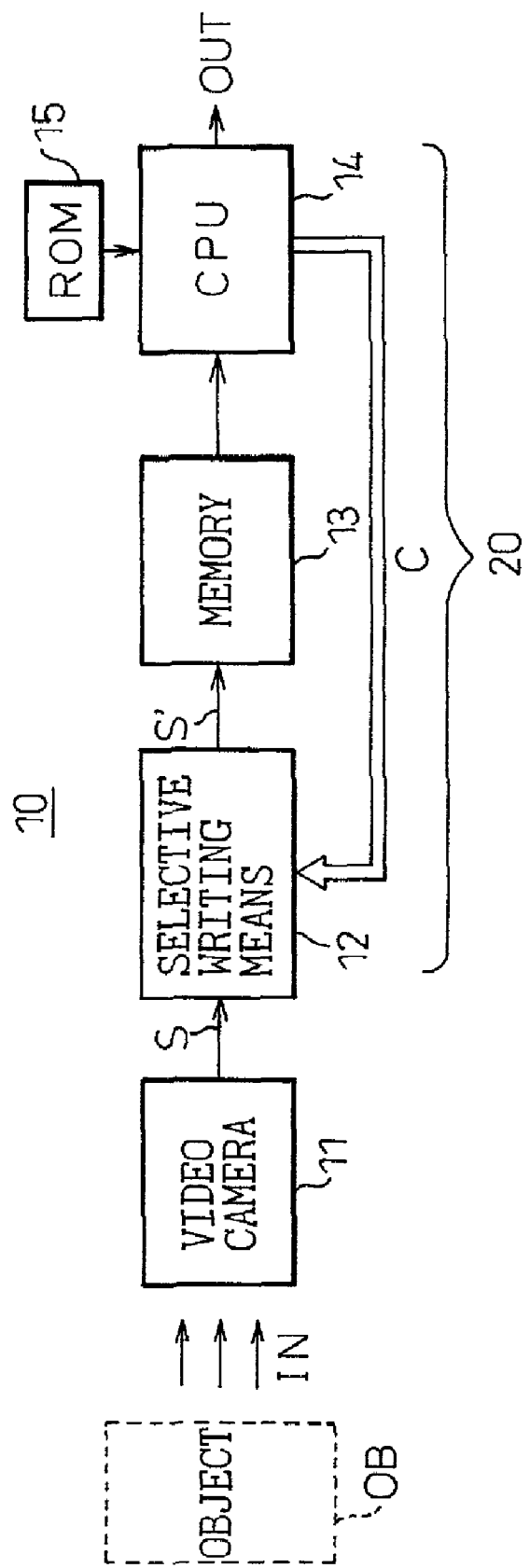
FIG. 2 is a block diagram showing the basic configuration of the present invention.

FIG. 2 is a block diagram showing the basic configuration of the present invention.

As shown, the image processing apparatus subsumed under the present invention comprises a video camera 11 for capturing an image of an object OB, a memory 13 for storing an image signal S supplied from the video camera 11, and a CPU 14 for performing prescribed processing on the image signal S read out of the memory 13. Reference numeral 20 is a computing processor containing the memory 13, CPU 14, and their attendant circuitry (see FIG. 3).

The notable feature of the present invention is the provision of a selective writing means 12 which is placed between the video camera 11 and the memory 13.

The selective writing means 12 performs a selective write operation by which only a designated portion of the image signal S from the video camera 11 is selected in accordance with a select command C issued from the CPU 13 and only the selected image signal S' is written into the memory 13.

In the prior art, such selective writing means 12 has not been provided, but the image signal S from the video camera 11 has been stored in its entirety as image data in the memory 13 after A/D conversion. This has given rise to the previously described first problem.

Further, in the prior art, the previously described optical axis misalignment occurring within the video camera 11 has been prestored, for example, in a ROM 15, and the correction for the optical axis misalignment has been performed by the CPU 14 by adding or subtracting the amount of optical axis misalignment to or from the image data on a pixel-by-pixel basis. This has given rise to the previously described second problem.

By contrast, according to the present invention, since only the selected image signal S', the minimum required for the prescribed processing, is stored in the memory 13 in accordance with the select command C the CPU 14 issues to the selective writing means 12, the necessary memory capacity can be reduced (solution 1 of the first problem).

Further, by just giving the select command C from the CPU 14 to the selective writing means 12 based on the data (the amount of optical axis misalignment) read out of the ROM 15, the selected image signal S' taken from an image area equivalent to one corrected for the optical axis misalignment can be stored in the memory 13 (solution of the second problem).

Specific forms of the select command C will be described in detail later.

Furthermore, in the present invention, the image is split into a plurality of regions, and the pixel data to be stored in the memory is selected by switching between the plurality of regions. This also serves to reduce the necessary memory capacity (solution 2 of the first problem).

Figure 3:
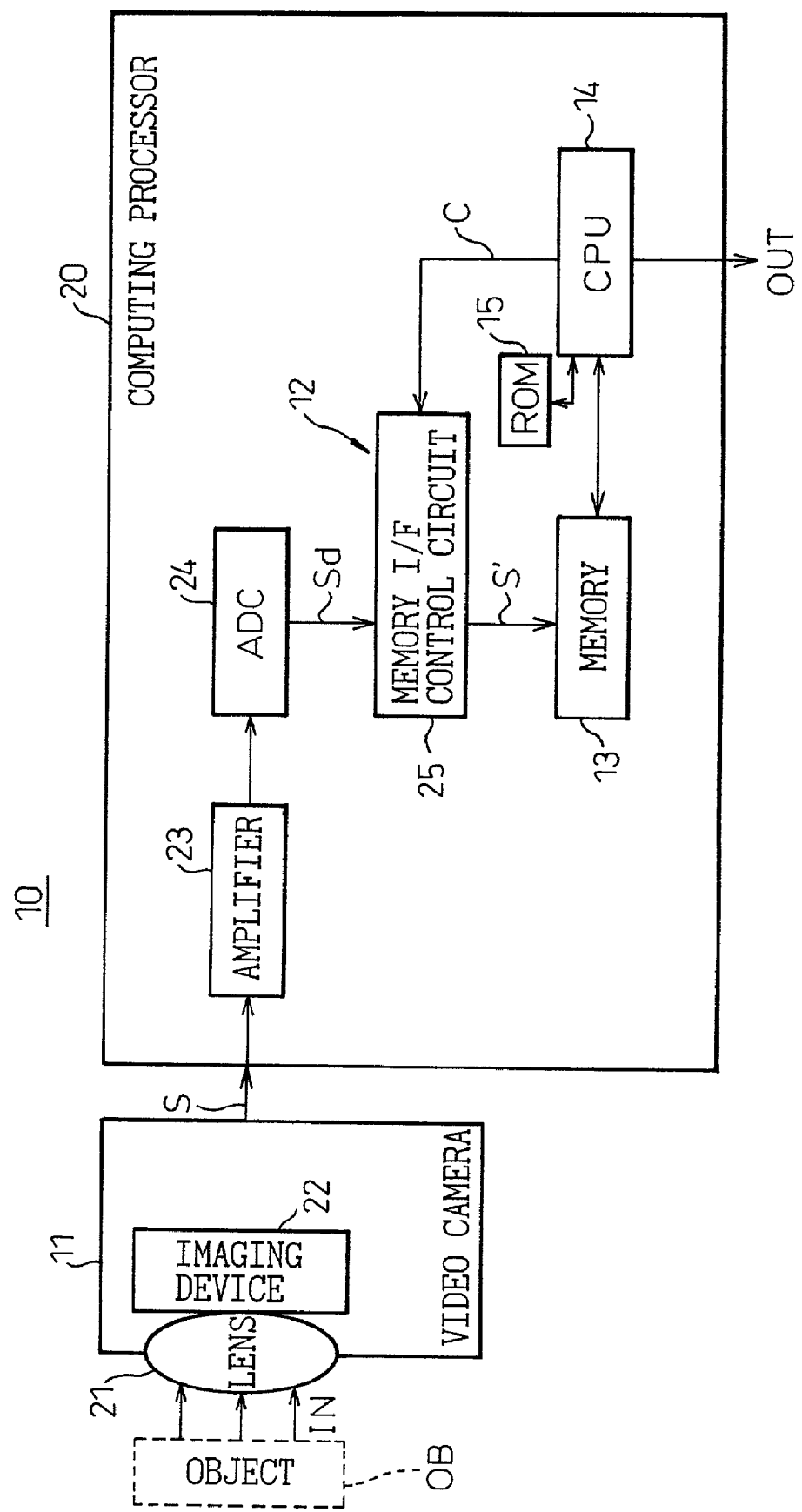
FIG. 3 is a diagram showing one specific example of the basic configuration shown in FIG. 2.

FIG. 3 is a diagram showing one specific example of the basic configuration shown in FIG. 2.

In the figure, the image processing apparatus 10 comprises the video camera 11 and the computing processor 20 as shown in FIG. 2.

The video camera 11 includes a lens 21 and an imaging device 22. The video camera 11 is mounted, for example, on or near a rearview mirror in a vehicle and/or near the center of the rear window of the vehicle.

The analog image signal S from the video camera 11 is input to the computing processor 20 where the signal is first amplified by an amplifier 23 and then converted by an ADC (Analog/Digital Converter) 24 into a digital image signal $S_d$.

The selective writing means 12 of FIG. 2 which characterizes the present invention is shown here as a memory I/F control circuit 25 as one specific example. The memory I/F control circuit 25 controls data writing (the image signal $S_d$) to the memory 13 in accordance with the select command C from the CPU 14. It also controls data loading into the CPU 14. The circuit 25 also performs other control operations.

Figure 4:
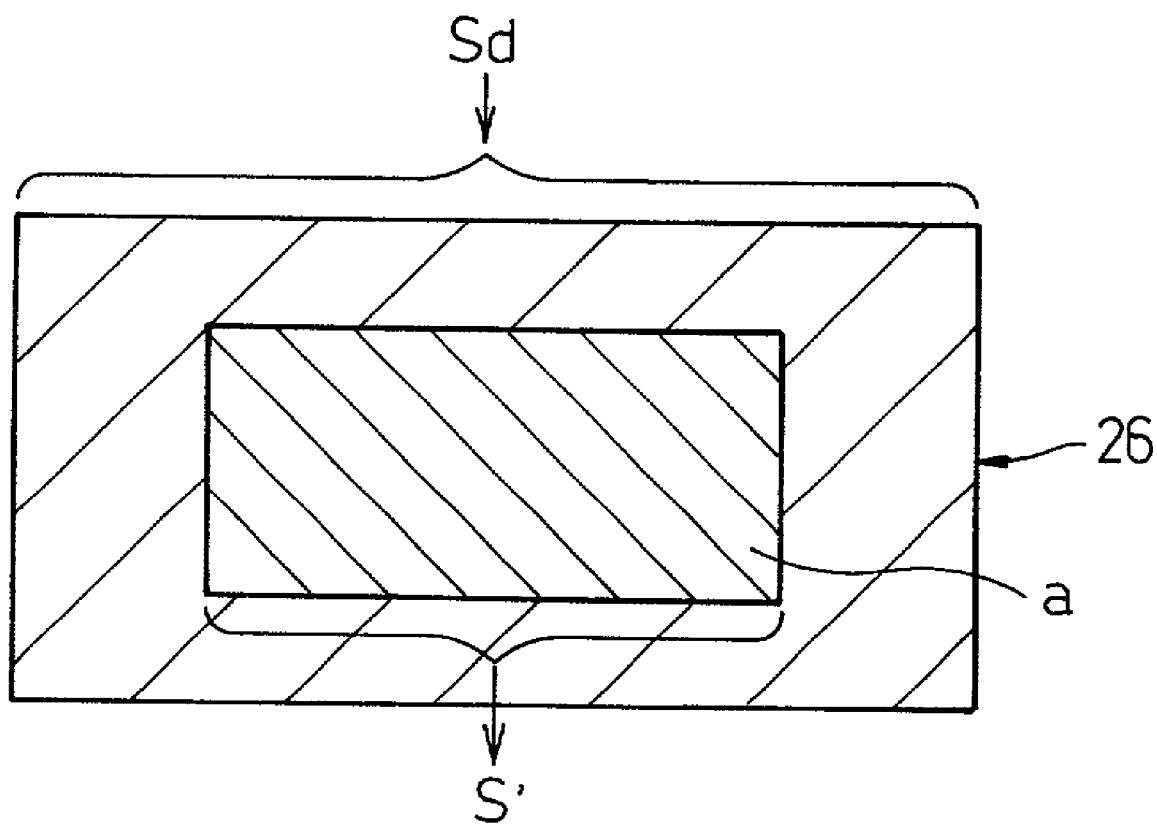
FIG. 4 is a diagram schematically illustrating an outline of the operation of a selective writing means 12.

FIG. 4 is a diagram schematically illustrating an outline of the operation of the selective writing means 12.

As shown, in accordance with the select command C from the CPU 14, the selective writing means 12 selects the portion of the image signal that corresponds to an area "a" necessary for the prescribed processing from within the imaging surface 26 defined by the image signal $S_d$, and outputs that portion of the image signal as the selected image signal S' (solution 1 of the first problem).

Figure 5:
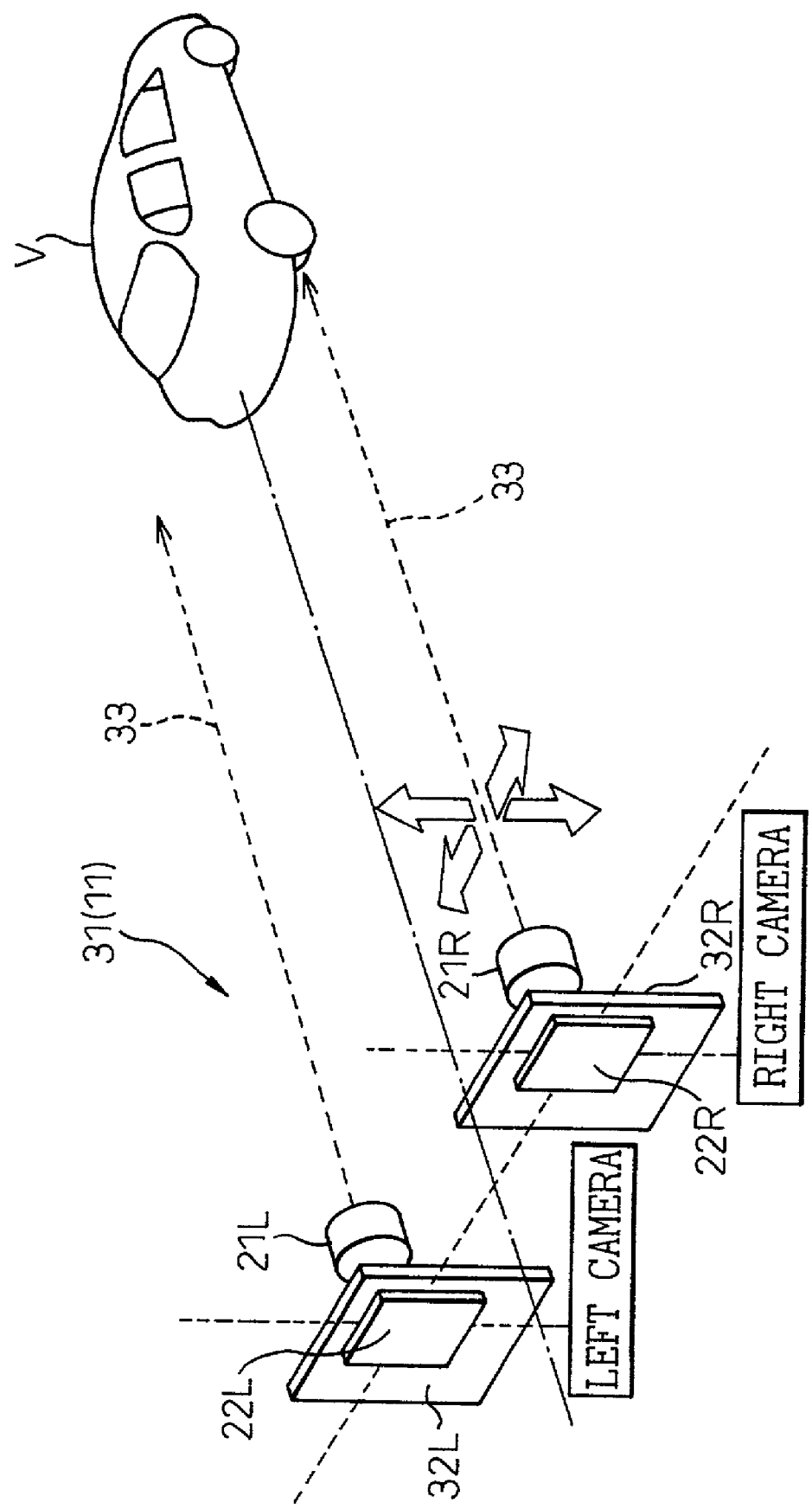
FIG. 5 is a perspective view for explaining an optical axis misalignment of a stereo camera.

FIG. 5 is a perspective view for explaining an optical axis misalignment of a stereo camera. This diagram is particularly related to the previously described second problem.

In the figure, the video camera 11 is constructed from a stereo camera 31 which comprises a left camera and a right camera. The left camera (and the right camera also) comprises an imaging device 22L (22R) consisting of a sensor chip formed on a camera substrate 32L (32R), and a lens 21L (21R) for focusing an image of a vehicle V ahead onto the imaging device.

The stereo camera 31 also includes mechanical components, and this causes an optical axis misalignment with the optical axis 33 displaced, for example, in at least one of the directions shown by the upward, downward, leftward, and rightward directed arrows in the figure.

Figure 6:
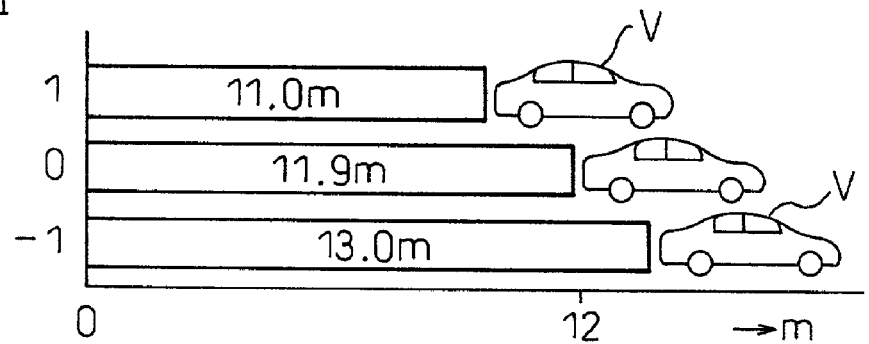
FIG. 6 is a graph showing distance measurement errors caused by optical axis misalignment in an easy-to-understand form.

FIG. 6 is a graph showing distance measurement errors caused by the optical axis misalignment in an easy-to-understand form.

In this graph, the vertical axis shows the amount of pixel displacement associated with the optical axis misalignment, and the horizontal axis represents the measurement error (in meters) due to the pixel displacement.

As can be seen from the graph, only one-pixel displacement causes an error as large as 11.0 m to 13.0 m.

To correct this optical axis misalignment, it has been practiced in the prior art to record the amount of optical axis misalignment (amount of pixel displacement) in the ROM 15 at the factory and to apply corrections to measurement data by performing addition/subtraction operations using the CPU 14. This, however, has had the problem that the burden of the CPU 14 increases significantly, resulting in increased processing time (as earlier described).

The present invention addresses this problem from an entirely different angle. That is, in FIG. 4, the area "a" is shifted in its entirety across the imaging surface 26 by an amount equal to the amount of optical axis misalignment. Then, image data ($S_d$) read from the thus shifted area is stored as the selected image signal S' in the memory 13. By so doing, the CPU 14 can output correct measurement data without any need to consider the amount of optical axis misalignment.

Figure 7:
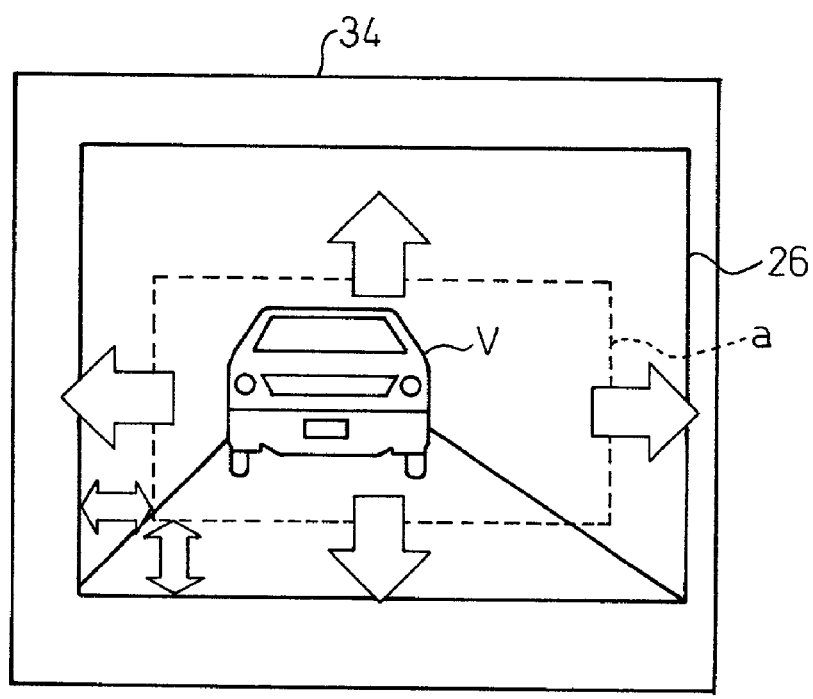
FIG. 7 is a diagram showing how the optical axis misalignment is corrected by shifting an area "a"

FIG. 7 is a diagram showing how the optical axis misalignment is corrected by shifting the area "a".

Reference numeral 34 is a display which is, for example, a display for a navigation system. The imaging surface 26 previously shown in FIG. 4 appears on the screen of this display 34, and the area "a" according to the present invention is set within the imaging surface 26.

According to the present invention, the area "a" is defined by shifting it in at least one of the arrow directions shown in FIG. 7 in such a manner as to compensate for the displacement in the up/down and left/right arrow directions shown in FIG. 5 and representing the optical axis misalignment, and the selected image signal S' corresponding to the area "a" is stored in the memory 13.

The CPU 14 accesses the memory 13 to read out the selected image signal S' corresponding to the thus shifted area "a", and performs prescribed processing to calculate the distance. Distance measurement is done based on the known principle of triangulation.

To summarize the above, the selective writing means 12 of the present invention is characterized in that the amount of optical axis misalignment obtained by measuring the displacement of the optical axis 33 of the stereo camera constituting the video camera 11 is prestored, for example, in the ROM 15 and, based on the prestored amount of optical axis misalignment, the area "a" necessary for prescribed processing such as distance measurement is shifted across the imaging surface 26 (solution of the second problem).

The select command C that the CPU 14 issues includes not only the command for correcting the optical axis misalignment described above (first select command) but also commands for various other purposes. Embodiments implementing the commands in the latter group (second to sixth select commands) will be described below (solution 1 of the first problem).

Figure 8:
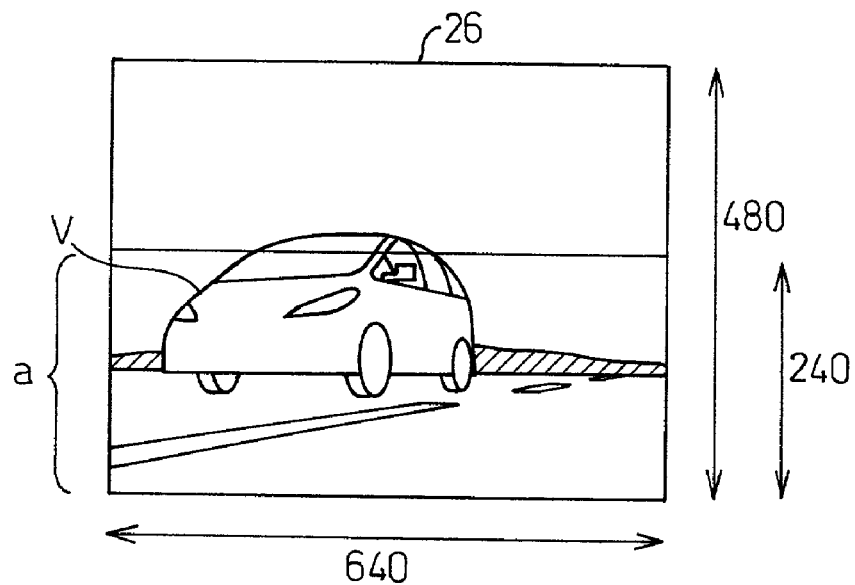
FIG. 8 is a diagram schematically illustrating the function of a second select command.

FIG. 8 is a diagram schematically illustrating the function of the second select command.

The selective writing means 12, based on the second select command C, selects the image signal $S_d$ representing the lower half area "a" of the imaging surface 26, and takes it as the selected image signal S'.

That is, of the 640×480 pixels, information only of 640×240 pixels representing one half of the area captured by the video camera 11 is stored in the memory 13.

This is because information only of the lower half is sufficient for the purpose of recognizing the vehicle V.

Figure 9:
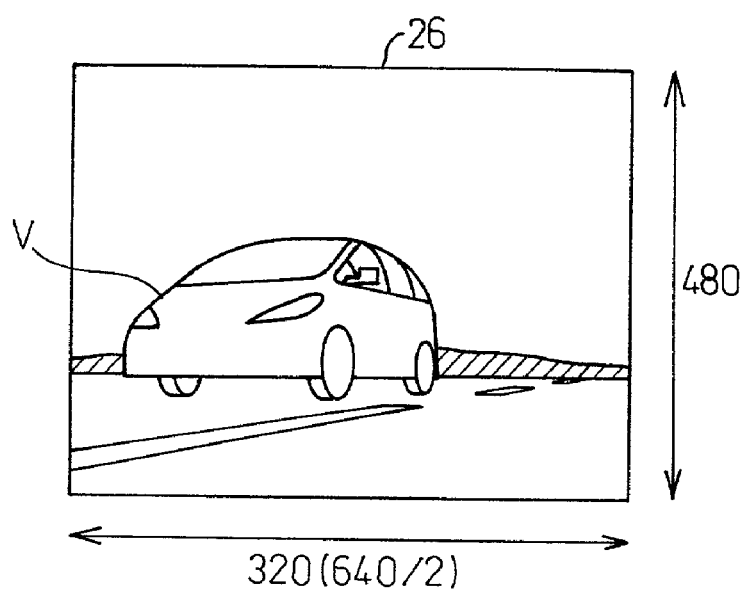
FIG. 9 is a diagram schematically illustrating the function of a third select command.

FIG. 9 is a diagram schematically illustrating the function of the third select command.

The selective writing means 12, based on the third select command C, horizontally things off the pixels forming the imaging surface 26, and takes the resultant image signal as the selected image signal S'.

That is, the 640×480 pixels are thinned off horizontally, and information only of 320×480 pixels is stored in the memory 13.

In an image processing apparatus for automotive application, it is important that the surrounding environment of the vehicle V, in particular, day/night situations, be considered when performing image recognition, and filtering appropriate to the day or night situation is applied.

Of the image signal $S_d$, information of the sky is particularly important for discrimination between day and night. Accordingly, the number of pixels taken in the vertical direction is 480 that can sufficiently cover the sky, while the pixels in the horizontal direction (640 pixels) are thinned off by a factor of 2 since information of the sky in the horizontal direction (640 pixels) is highly redundant.

Figure 10:
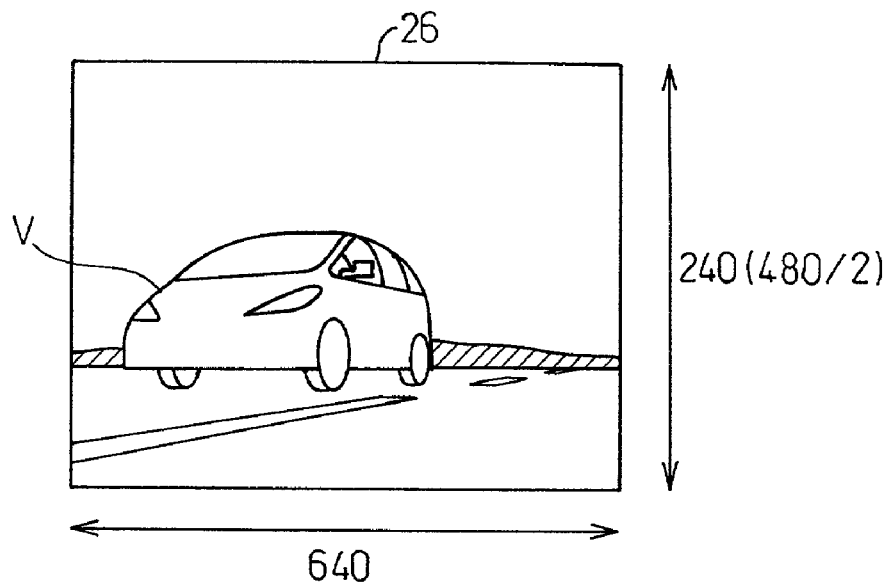
FIG. 10 is a diagram schematically illustrating the function of a fourth select command.

FIG. 10 is a diagram schematically illustrating the function of the fourth select command.

The selective writing means 12, based on the fourth select command C, vertically thinns off the pixels forming the imaging surface 26, and takes the resultant image signal as the selected image signal S'.

That is, the 640×480 pixels are thinned off vertically, and information only of 640×240 pixels is stored in the memory 13.

The fourth select command, like the third select command, can eliminate the vertical redundancy of the sky information.

Figure 11:
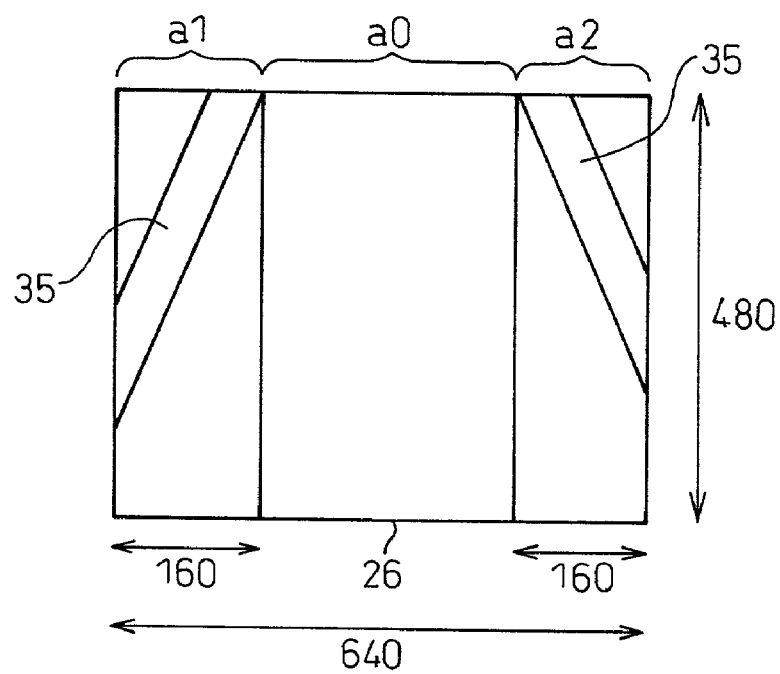
FIG. 11 is a diagram schematically illustrating the function of a fifth select command.

FIG. 11 is a diagram schematically illustrating the function of the fifth select command.

The selective writing means 12, based on the fifth select command C, splits the imaging surface 26 into a center area a0 and a left area a1 and right area a2 respectively located to the left and right thereof, selects image signals representing the left and right areas a1 and a2, and takes each of them as the selected image signal S'.

That is, of the 640×480 pixels, information only of the areas a1 and a2 where lane marks appear along the horizontal axis (160×2×480 pixels) is stored in the memory 13.

In the case of a system where the CPU 14 issues an alarm (OUT) to the driver when the vehicle V begins to run over either of the lane marks (white lines) 35 on the road, information only of the lane marks 35 suffices for the purpose.

Figure 12:
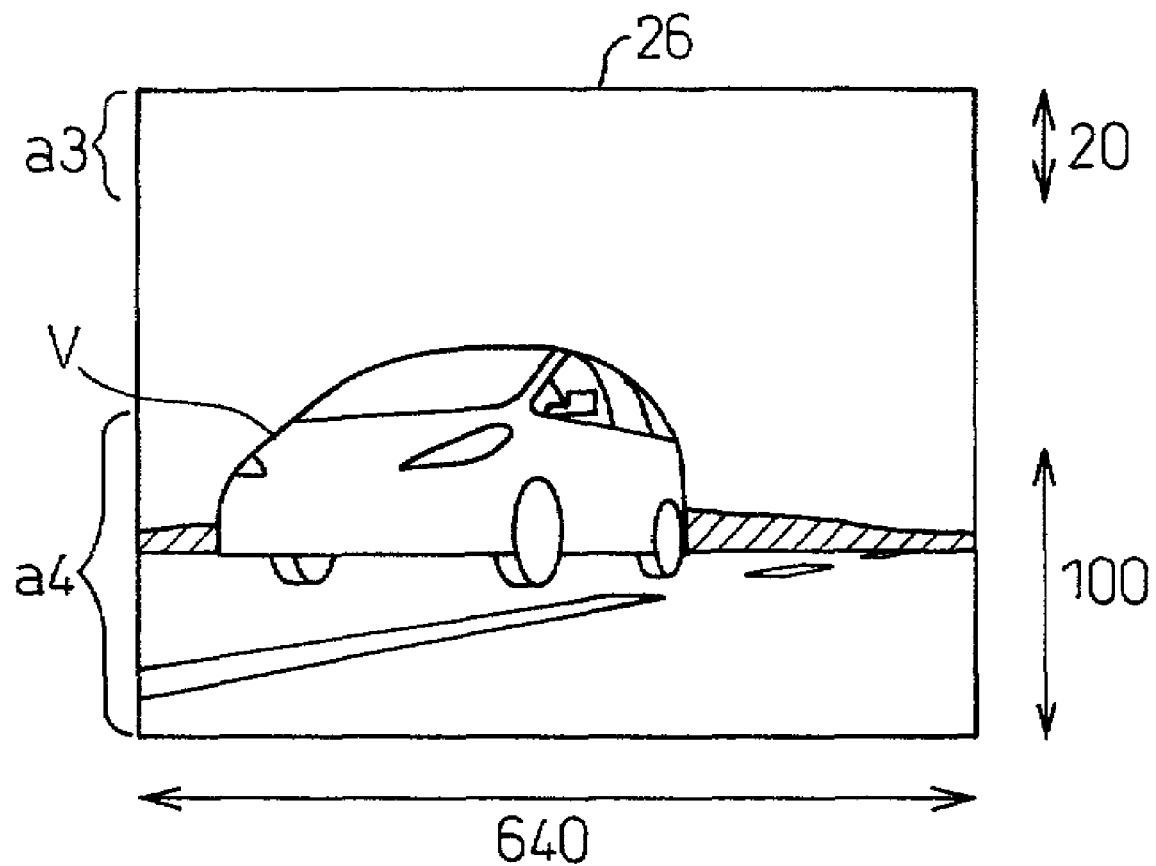
FIG. 12 is a diagram schematically illustrating the function of a sixth select command.

FIG. 12 is a diagram schematically illustrating the function of the sixth select command.

The selective writing means 12, based on the sixth select command C, selects an upper image signal representing a prescribed area a3 in the upper half of the imaging surface 26 and a lower image signal representing a prescribed area a4 in the lower half, and takes each of them as the selected image signal S'.

That is, of the 640×480 pixels, 20 vertical pixels in the upper sky portion are used to judge the brightness, and 100 vertical pixels in the bottom are used to recognize the vehicle V. In this case, it is only necessary to store a total of 512×120 pixels in the memory 13.

This is based on experimental results that about 20 vertical pixels in the sky portion is sufficient for the purpose of discriminating between day and night, and that about 100 vertical pixels is sufficient for the purpose of recognizing the presence of the vehicle V.

Supplemental explanation will be given of the third and fifth select commands C (FIGS. 9 and 11) described above. Since the video camera 11 generally employs the interlaced scanning scheme, it is easy to decimate the pixels in the vertical direction of the imaging surface 26. This can be accomplished, for example, by selecting signals $S_d$ only on the odd-numbered lines or only on the even-numbered lines. On the other hand, to horizontally decimate the pixels as in the case of the third and fifth select commands C, some other means becomes necessary, for example, a counter. This will be described in further detail below.

The computing processor 20 (FIG. 3) is provided with a counter function (not shown), and each time a predetermined counter value is reached, an image signal is selected from within the image signal S being output row by row (in the vertical axis direction) from the imaging device 22, and is stored as an image signal S' column by column (in the horizontal axis direction) in the memory 13.

Such read operations are performed using, for example, the memory I/F (interface) control circuit 25 shown in FIG. 3. In the case of FIG. 9, for example, the predetermined counter value is "2→4→6→ . . . →640" (even numbers). To increase the decimation ratio, the predetermined counter value should be set larger, for example, to every three or every four pixels.

Furthermore, in the present invention, the image is split into a plurality of regions, and the pixel data to be stored in the memory is selected by switching between the plurality of regions. In this way, the amount of pixel data to be stored in the memory is reduced (solution 2 of the first problem).

Embodiments implementing this solution will be described below.

FIG. 13 is a diagram for explaining an embodiment of a first selection switching mode. In part (a) of the figure, reference numeral 21 is a video camera lens, and 22 is an imaging device. In this example, as shown in part (b) of the figure, the imaging device 22 includes 1024 elements vertically and 768 elements horizontally, that is, about 0.8 million elements in total.

In FIG. 13(a), range (1) and range (2) each represent the range of the pixel data to be stored in memory for image processing out of the full pixel range captured by the imaging device. For example, when a lens is used that focuses an image within a view angle of 60° onto the imaging device, the range (1) is a range captured with a wide view angle of 60°, and the range (2) is a range captured with a narrow view angle of 30°. In the present invention, the angle of view is changed according to the vehicle speed.

When the vehicle is traveling at a slow speed, for example, at 40 km/h or slower, the angle of view is set to the wide angle shown by the range (1) to mainly capture a short distance within the field of view so that any vehicle trying to cut in, for example, can be recognized. In this case, of the 1024 horizontal pixels, 512 pixels are taken out by decimating every other pixel. Of the pixels in the vertical direction, 384 pixels in the lower half where the necessary image of the vehicle ahead, etc. can be obtained are interlaced-scanned and 240 lines are taken out. Then, data consisting of 512×240×8 (bits)=983,040 bits is stored in the memory for image processing.

On the other hand, when the vehicle is traveling at high speed, for example, at a speed exceeding 40 km/h, the angle of view is set to the narrow angle shown by the range (2) to mainly capture a long distance within the field of view. In this case, of the 1024 horizontal pixels, 512 pixels lying within the 30° angle range in the center are taken out without decimating them. As a result, necessary images within the prescribed range can be obtained at high density. Of the pixels in the vertical direction, 384 pixels in the lower half are interlaced-scanned and 240 lines are taken out, as in the case of the slow speed driving. Also, as in the case of slow speed driving, data consisting of 512×240×8 (bits) =983,040 bits is stored in the memory for image processing. In this example, of the pixels in the vertical direction, the pixel data only in the lower half where vehicles can be detected is taken out, but the pixel data in the upper half may also be included as necessary, or pixel data up to ⅔ of the way from the bottom may be taken out. That is, the only requirement is that data be taken out as necessary from the necessary area. The same also applies to the embodiments described hereinafter.

As described above, by switching the data to be stored in the memory between high-density pixel data representing an image within a designated range and relatively low-density pixel data covering an entire image range, only necessary data can be stored in the memory, and the amount of data to be stored in the memory can thus be reduced. Furthermore, the function of a wide angle lens and the function of a telephoto lens can be achieved using one video camera and with the same amount of data, and the necessary field of view can be obtained for slow speed and high speed driving. The density of pixel data is in relative terms; for example, the pixel data density may be increased for the necessary portion of an image and reduced for other portions, the only requirement being to make effective use of pixel data within a limited range.

While the wide angle of view or the narrow angle of view can be selected according to the vehicle speed, provisions can also be made to switch the angle of view between the wide angle range and the narrow angle range at preset intervals of time, for example, every one second or one minute, regardless of the vehicle speed, thereby capturing objects at short and long distances simultaneously.

In the above example, the angle of view is switched between the wide angle range and the narrow angle range according to the vehicle speed, but it is also possible to continuously vary the angle of view within an angle range of 0° to 60°, in other words, within a range of 0% to 100% in the horizontal direction of the image.

Figure 14:
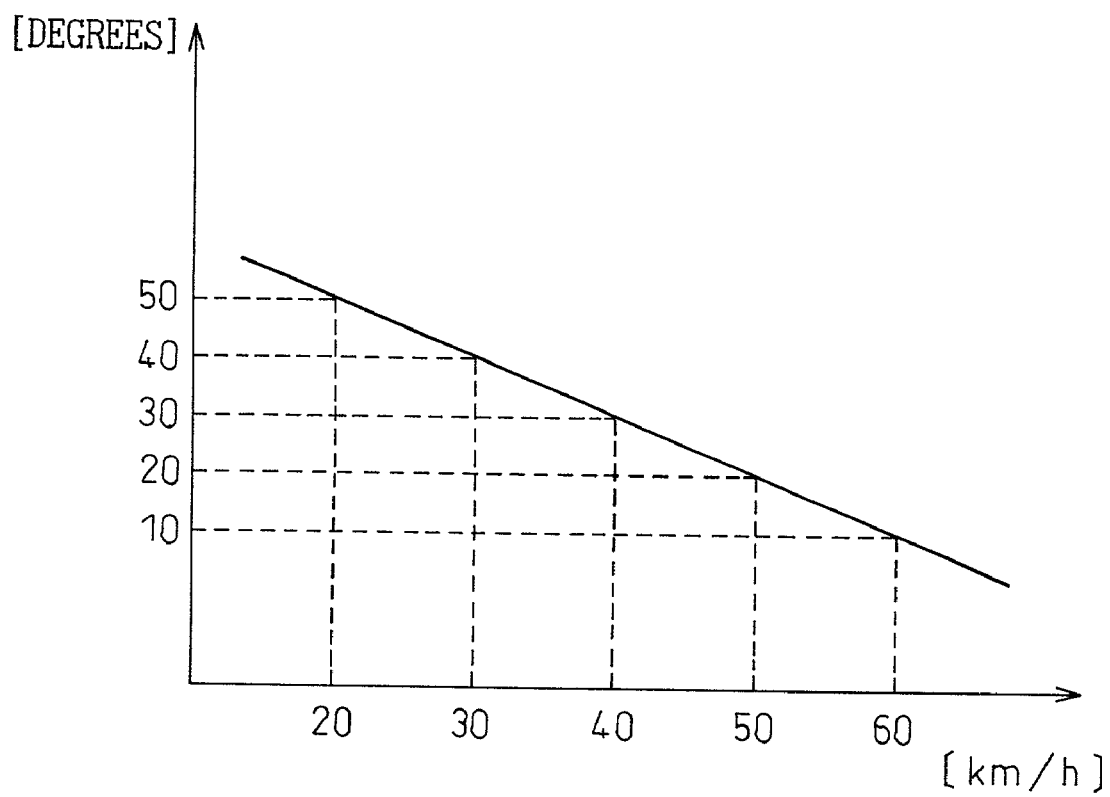
FIG. 14 is a graph showing one example of how the angle of view is varied in accordance with vehicle speed in the embodiment of the first selection switching mode.

Further, as shown in FIG. 14, the angle of view can be varied linearly and continuously according to the vehicle speed. FIG. 14 is a graph showing one example of how the angle of view is varied as a function of the vehicle speed.

The horizontal axis shows the vehicle speed per hour, and the vertical axis the angle of view. In the illustrated example, the angle of view is set to 30° when the vehicle speed is 40 km/h, the angle of view decreasing with increasing speed and increasing with decreasing speed.

Figure 15:
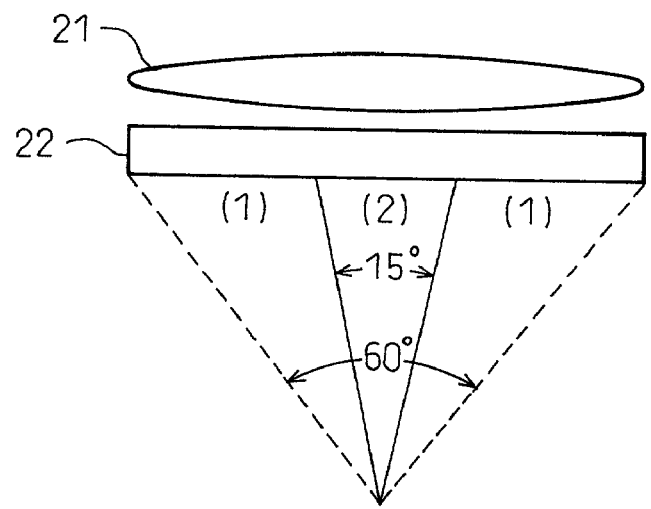
FIG. 15 is a diagram for explaining an embodiment of a second selection switching mode.

FIG. 15 is a diagram for explaining another embodiment of a second selection switching mode. In the figure, the density of pixels taken from the center range (2) is high, while the density of pixels taken from the surrounding range (1) is relatively low. For example, in the range (2), the angle of view is 15°, and 256 horizontal pixels within this angle range is taken out. On the other hand, in the range (1), there are 768 pixels horizontally within a total angle range of 45°. The number of pixels here is equal to the total number of horizontal pixels (1024) minus the number of pixels (256) taken from the range (2).

Of the 768 pixels, every three pixels are taken out (256 pixels) and stored in the memory. Of the pixels in the vertical direction, 384 pixels in the lower half are interlaced-scanned and 240 lines are taken out, as in the foregoing embodiment. By taking out the pixels to be stored in the memory as described above, a high-density image can be taken out from the center area, and a relatively low-density image from the surrounding area.

In this case also, 512 pixels are taken out horizontally and 240 pixels vertically, and the amount of pixel data stored in the memory is 512×240×8 (bits)=983,040 bits, as in the foregoing embodiment. In this way, the image most needed can be obtained by varying the selection range and density of pixels, without increasing the amount of data.

Figure 16:
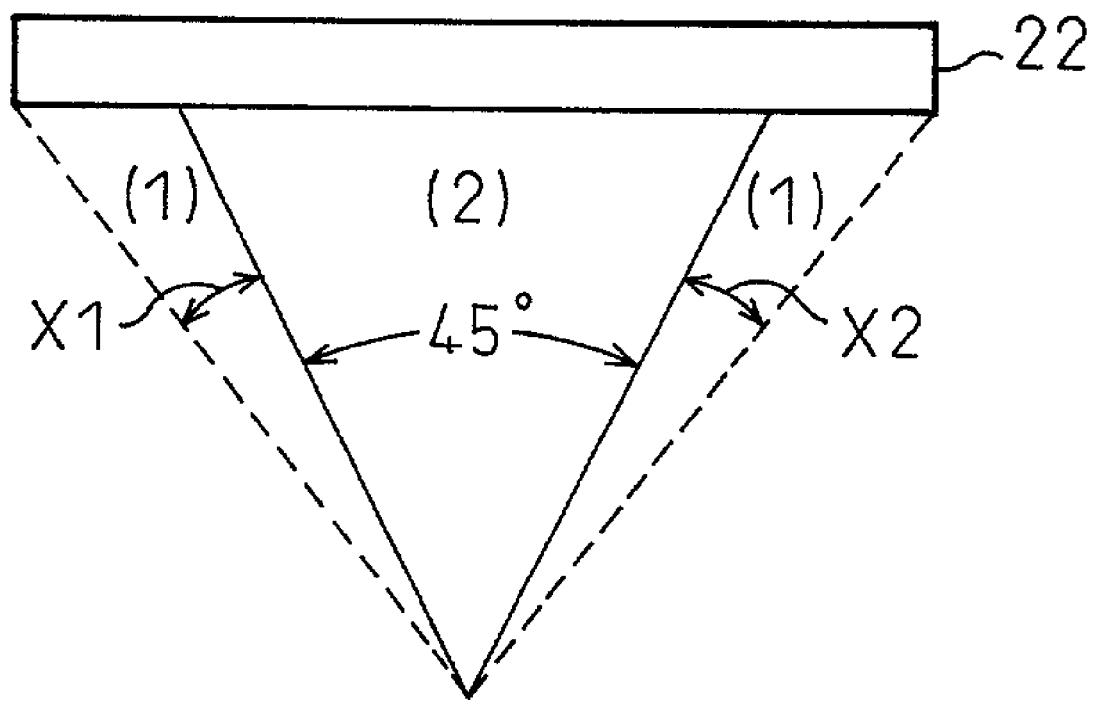
FIG. 16 is a diagram for explaining an embodiment of a third selection switching mode.

FIG. 16 is a diagram for explaining a modified example of the second selection switching mode explained with reference to FIG. 15 (that is, an embodiment of a third selection switching mode). In this modified example, the density of pixels taken from the center range (2) is low, while the density of pixels taken from the surrounding range (1) is relatively high. In the surrounding range (1), the combined angle of view of angle x1 and angle x2 is 15°, and in the center range (2), the angle of view is 45°. Then, 256 horizontal pixels are taken from the surrounding range (1), and of the 768 horizontal pixels in the center range (2), every three pixels are taken out (256 pixels). Of the pixels in the vertical direction, 384 pixels in the lower half are interlaced-scanned and 240 lines are taken out, as in the foregoing embodiment. By taking out the pixels as described above, a high-density image can be taken out from the surrounding area, and a relatively low-density image from the center area.

Then, the image can be selected by switching according to the vehicle speed between the image whose density is high in the center area and the image whose density is high in the surrounding area.

It is also possible to switch from the image whose density is high in the center area to the image whose density is high in the surrounding area and vice versa at predetermined intervals of time.

Furthermore, provisions may be made to switch between the image whose density is high in the center area and the image whose density is high in the surrounding area according to the distance to the vehicle ahead. For example, the image whose density is high in the surrounding area is selected when the distance to the vehicle ahead is within 30 m, and the image whose density is high in the center area is selected when the distance to the vehicle ahead is over 30 m. The opposite is also possible.

In the above embodiment, the image is split between two ranges, one with an angle of 45° and the other 15°, but these angles can be changed as desired.

Figure 17:
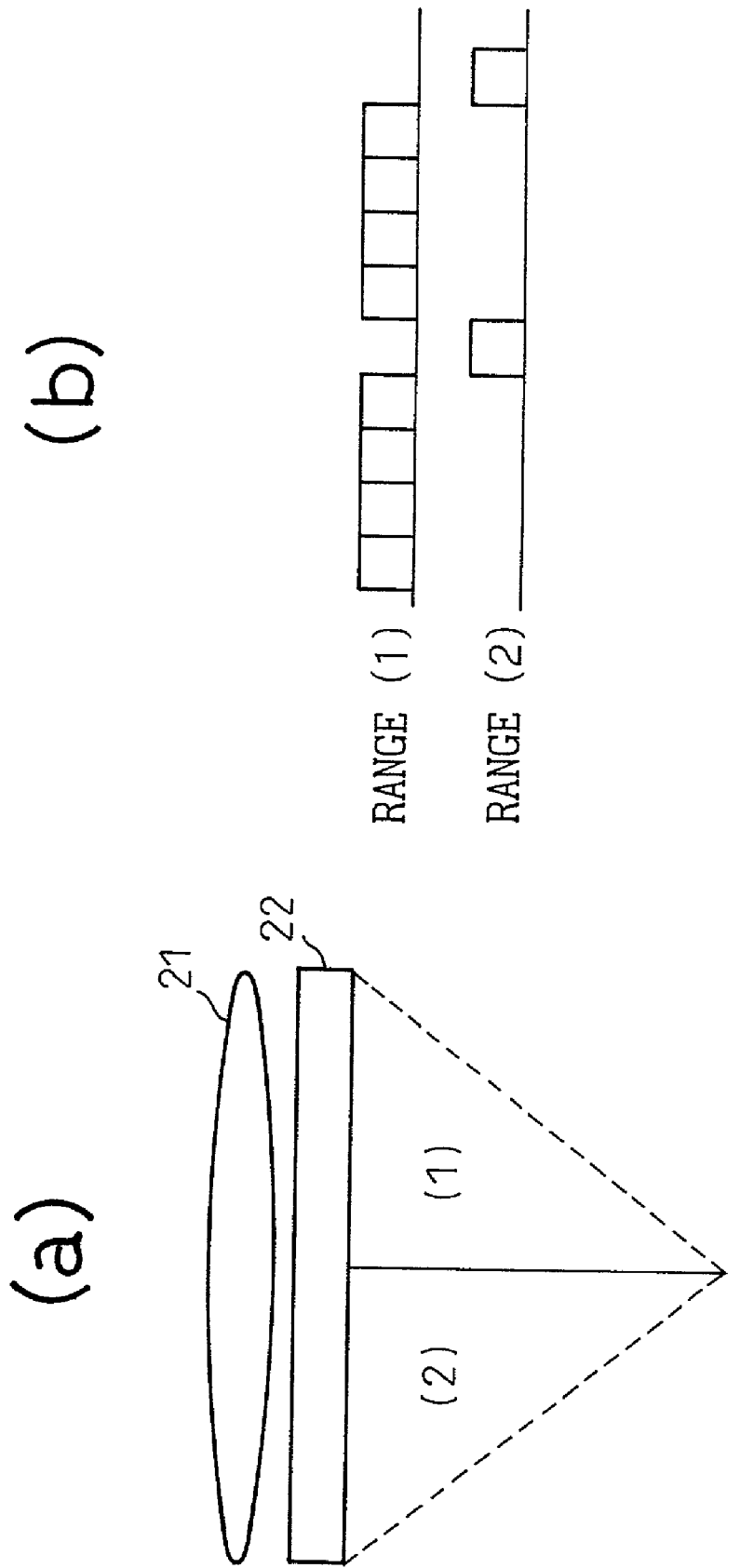
FIG. 17 is a diagram for explaining an embodiment of a fourth selection switching mode.

FIG. 17 is a diagram for explaining an embodiment of a fourth selection switching mode. As shown in part (a) of the figure, range (1) and range (2) are provided at the left and right, respectively, each with an angle of view of 30°. Of the 1024 pixels in the horizontal direction of an image, at one point in time, one-half of the pixels, i.e., 512 pixels, are taken out as high-density pixel data from the range (1) at the right, and at another, they are taken from the range (2) at the left. Of the pixels in the vertical direction, 384 pixels in the lower half are interlaced-scanned and 240 lines are taken out, as in the foregoing embodiment. Provisions are made so that the range from which pixels are taken out can be switched between the range (1) and the range (2) as desired. For example, either one of the ranges may be selected by switching from one range to the other at preset intervals of time; for example, the period during which pixels are taken out from the range (1) at the right may be increased if an image, for example, on the right-hand side of the path of the vehicle is particularly needed. In this case, the duration of the range (1) is set, for example, at 80% of the total time and that of the range (2) at 20%, as shown in part (b) of the figure. In the opposite case, 20% of the time, for example, is assigned to the range (1) and 80% to the range (2).

In the above embodiment, the screen is split into two equal parts left and right, but the screen need not necessarily be split into two equal parts left and right.

Figure 18:
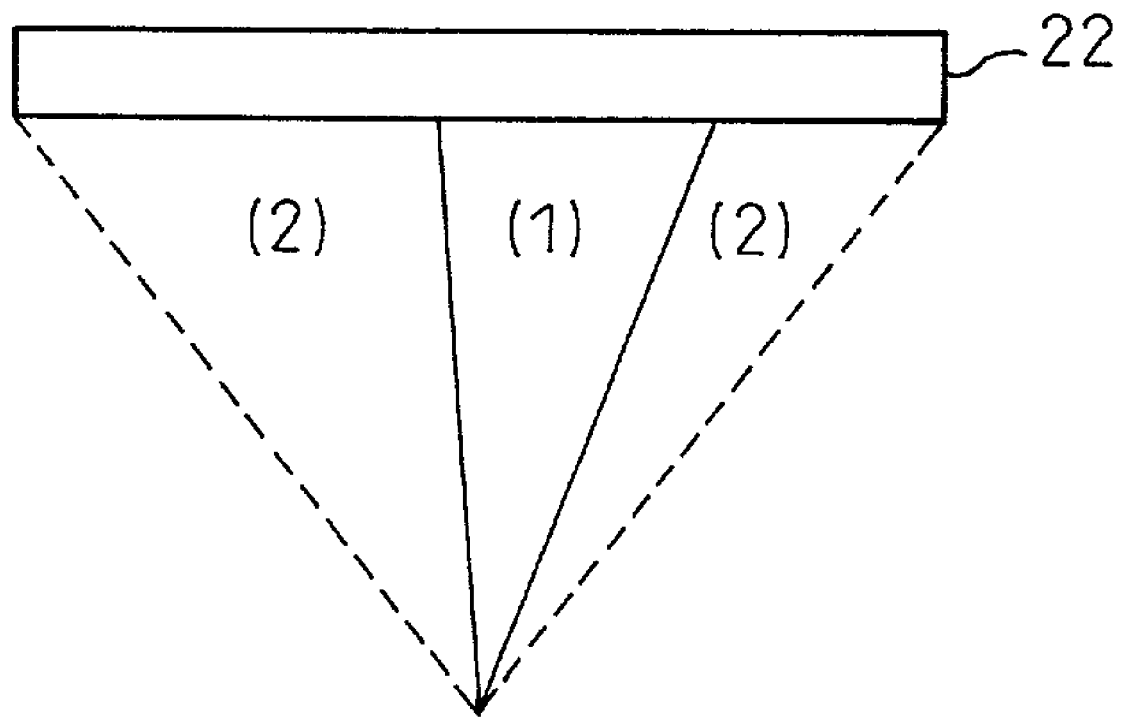
FIG. 18 is a diagram for explaining an embodiment of a fifth selection switching mode.

FIG. 18 is a diagram for explaining an embodiment of a fifth selection switching mode. In the figure, the angle of view is divided horizontally between a designated range (1) and the remaining ranges (2), and the density of pixel data taken from the range (1) is high, while the density of pixel data taken from the ranges (2) is relatively low. The range (1) located inward in the figure can be moved as desired without changing its angle of view. That is, the range (1) is made freely movable in the horizontal direction of the screen. For example, when a vehicle trying to cut in from the right is detected, the range (1) is moved to the right, and conversely, when a vehicle trying to cut in from the left is detected, the range (1) is moved to the left. To describe the configuration in more detail, the number of pixels captured by the range (1) is, for example, 384, and of the 640 pixels (1024−384=640) in the ranges (2), four in five pixels are decimated and a total of 128 pixels are captured and stored in the memory. Therefore, in this embodiment also, the number of horizontal pixels stored in the memory is 512. Of the pixels in the vertical direction, if 384 pixels in the lower half are interlaced-scanned and 240 lines are taken out, as in the foregoing embodiment, then the amount of data stored in the memory is the same as that in the foregoing embodiment.

What is claimed is:

1. An image processing apparatus for a vehicle, comprising a video camera for shooting an object, a memory for storing an image signal supplied from said video camera, and a CPU for performing prescribed processing on said image signal read out of said memory, wherein said image processing apparatus includes selective writing means for providing, in accordance with a select command from said CPU, an upper image signal representing a portion corresponding to a designated area in an upper half of an imaging surface defined by said image signal supplied from said video camera and a lower image signal representing a portion corresponding to a designated area in a lower half of said imaging surface, and for writing only said upper and lower image signals as selected image signals into said memory; and said CPU recognizes a brightness of sky from said selected upper image signal and thereby judges either day time or night time, and recognizes presence of a vehicle ahead from said selected lower image signal;

wherein a number of pixels of said designated area in said upper half of said imaging surface is smaller than a number of pixels of said designated area in said lower half of said imaging surface.

2. An image processing apparatus for a vehicle, comprising a video camera for shooting an object, a memory for storing an image signal supplied from said video camera, and a CPU for performing prescribed processing on said image signal read out of said memory, wherein said image processing apparatus includes selective writing means for providing, in accordance with a select command from said CPU, an upper image signal representing a portion corresponding to a designated area in an upper half of an imaging surface defined by said image signal supplied from said video camera and a lower image signal representing a portion corresponding to a designated area in a lower half of said imaging surface, and for writing only said upper and lower image signals as selected image signals into said memory;

said CPU recognizes a brightness of sky from said selected upper image signal and thereby judges either day time or night time, and recognizes presence of a vehicle ahead from said selected lower image signal; and filtering appropriate to the day time or the night time is applied to said selected image signals, wherein a number of pixels of said designated area in said upper half of said imaging surface is smaller than a number of pixels of said designated area in said lower half of said imaging surface, and wherein said CPU recognizes the brightness of sky from said selected upper image signal representing a portion corresponding to said designated area in said upper half of said imaging surface and thereby judges either day time or night time.

* * * * *